US012200031B1

(12) United States Patent
Pillutla et al.

(10) Patent No.: US 12,200,031 B1
(45) Date of Patent: Jan. 14, 2025

(54) PREPROCESSING CONFERENCE AUDIO DATA

(71) Applicant: Zoom Video Communications, Inc., San Jose, CA (US)

(72) Inventors: Sumitha Pillutla, San Francisco, CA (US); Nicholas Alexander Sieracki, Sylmar, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/474,769

(22) Filed: Sep. 26, 2023

(51) Int. Cl.
*H04L 65/403* (2022.01)
(52) U.S. Cl.
CPC .................. *H04L 65/403* (2013.01)
(58) Field of Classification Search
CPC ...................................... H04L 65/403
See application file for complete search history.

(56) References Cited

U.S. PATENT DOCUMENTS

| 6,850,609 | B1 * | 2/2005 | Schrage ............... | G10L 15/26 704/235 |
| 10,650,244 | B2 | 5/2020 | Meisser et al. | |
| 2018/0234471 | A1 * | 8/2018 | Qian ................. | H04L 61/2564 |
| 2020/0304547 | A1 * | 9/2020 | Lu .................. | H04L 65/1104 |
| 2022/0385857 | A1 * | 12/2022 | Ittelson ............ | H04N 7/155 |
| 2023/0343360 | A1 * | 10/2023 | Singh .............. | G10L 25/69 |

FOREIGN PATENT DOCUMENTS

WO      WO-2004006475 A2 *   1/2004   ............. H04L 12/18

OTHER PUBLICATIONS

Descript Help, Troubleshooting, Recording Zoom meetings with separate audio tracks, https://help.descript.com/hc/en-us/articles/10636562032653-Recording-Zoom-meetings-with-separate-audio-tracks, retrieved from internet Aug. 28, 2023, 6 pages.

* cited by examiner

*Primary Examiner* — Philip C Lee
(74) *Attorney, Agent, or Firm* — Young Basile Hanlon & MacFarlane, P.C.

(57) ABSTRACT

A conferencing server receives audio data from devices connected to a conference. The conferencing server generates multiple time-contiguous containers. Each time-contiguous container includes an identifier of an associated device of the devices and one or more payloads of the audio data from the associated device. Each payload has a predefined time length. The conferencing server transmits the multiple time-contiguous containers to a consumer server.

20 Claims, 9 Drawing Sheets

PREPROCESSING CONFERENCE AUDIO DATA

FIELD

This disclosure relates to preprocessing conference audio data. The audio data may be associated with an audio conference or a video conference, and may be preprocessed for transcription, artificial intelligence uses, or other uses.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
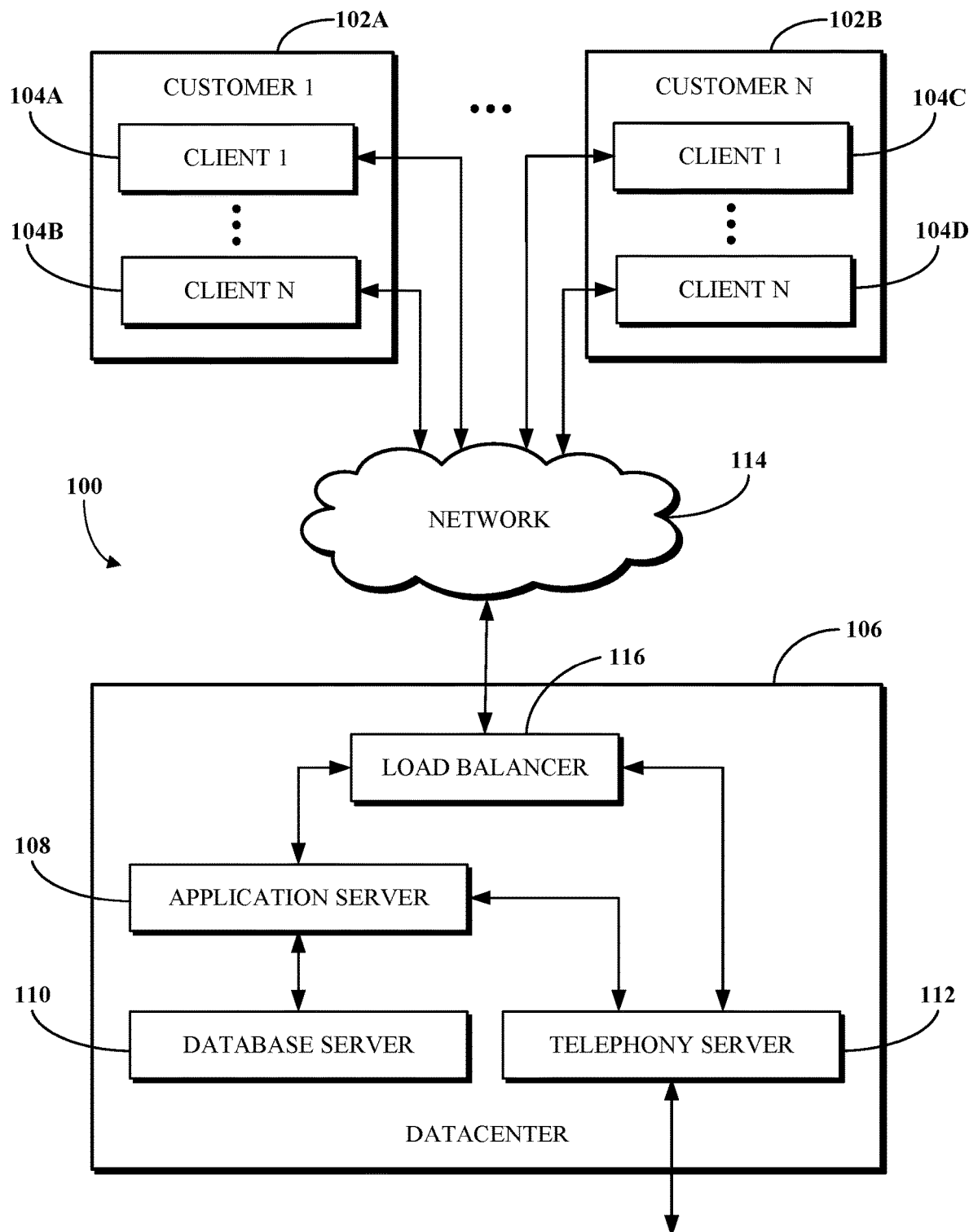
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) or a contact center as a service (CCaaS) platform.

Automated processing of recorded conferencing data, for example, for transcription, artificial intelligence (AI) inference, or machine learning (ML) inference may be desirable. Having a conference automatically transcribed may be advantageous, for example, to allow participants in the conference to quickly access what was said. In addition, with appropriate permissions being provided by the participants of the conference, data from the conference may be used in inference by AI/ML technology. For example, in a sales conference (or a contact center engagement where a proposed sale is discussed), AI/ML technology may be used to provide real-time feedback to the salespersons, evaluating the likelihood that a deal would close and/or providing suggestions for the salespersons to address feedback on the deal provided by counterparties. Such AI/ML technology may be trained using reinforcement learning and/or using supervised learning.

According to some schemes, devices connect to a conferencing server to engage in a conference. Upon notifying the users of the devices and obtaining their consent, the conferencing server may generate a recording (e.g., an audio recording or a video recording) of the conference during the conference. After the conference is completed, the conferencing server provides the recording to a consumer server, which processes the recording, for example, for transcription or AI/ML use cases. Drawbacks of these schemes include that the processing occurs after the conference is over, not in real-time during the conference. As a result, real-time feedback cannot be provided using AI/ML and a real-time transcript might not be available. A real-time transcript may be useful, for example, to assist a participant who joins the conference late in learning what was already discussed. Furthermore, the recording generated using these schemes might not associate each audio (or video) payload with a speaker or a device that provided the audio. As the foregoing illustrates, improved techniques for preprocessing conference recording data for use by a consumer server may be desirable.

Implementations of this disclosure address problems such as these by preprocessing, at a conferencing server that may be operated by a conferencing service provider, conferencing data prior to provision to a consumer server. The consumer server may be operated by an entity different from the conferencing service provider. In one non-limiting example use case, the consumer server may be operated by a university that uses conferences for online learning or by a car dealership that that engages in conferences with potential car buyers. Alternatively, the consumer server may be operated by the conferencing service provider. The preprocessed data may be used, at the consumer server, for various use cases, such as transcription or AI/ML use cases.

The conferencing server receives audio data from devices connected to a conference. The audio data may include audio data only or the audio data may be transmitted in conjunction with imagery (e.g., one or more video frames of the conference, including at least one of camera-generated imagery or screensharing imagery) in a video conference. The conferencing server generates multiple time-contiguous containers (e.g., lasting up to 250 milliseconds (ms) each). Each time-contiguous container is associated with a time range, and the time ranges of the multiple time-contiguous containers are mutually exclusive and collectively exhaustive. Each time-contiguous container includes an identification of a speaker device and includes audio payloads, with each audio payload being from the speaker device and lasting for a predetermined amount of time (e.g., 10 ms). The conferencing server transitions between containers in response to at least one of: detecting audio (e.g., at a volume exceeding a threshold volume) from a device different from the speaker device, a predetermined number of payloads (e.g., 25) being generated in the current container, or a passage of a time period (e.g., 250 ms) since the beginning of the current container. After each container is generated, the conferencing server transmits the generated container to the consumer server for processing thereat. The consumer server may use the received containers to perform at least one of transcribing the conference or AI/ML inference.

To enhance privacy and safety, as well as provide other benefits, the artificial intelligence models and/or machine learning models discussed herein may be trained using one or more commercially available data sets that do not contain recorded conferencing data.

To describe some implementations in greater detail, reference is first made to examples of hardware and software structures used to implement a system for preprocessing conference audio data. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
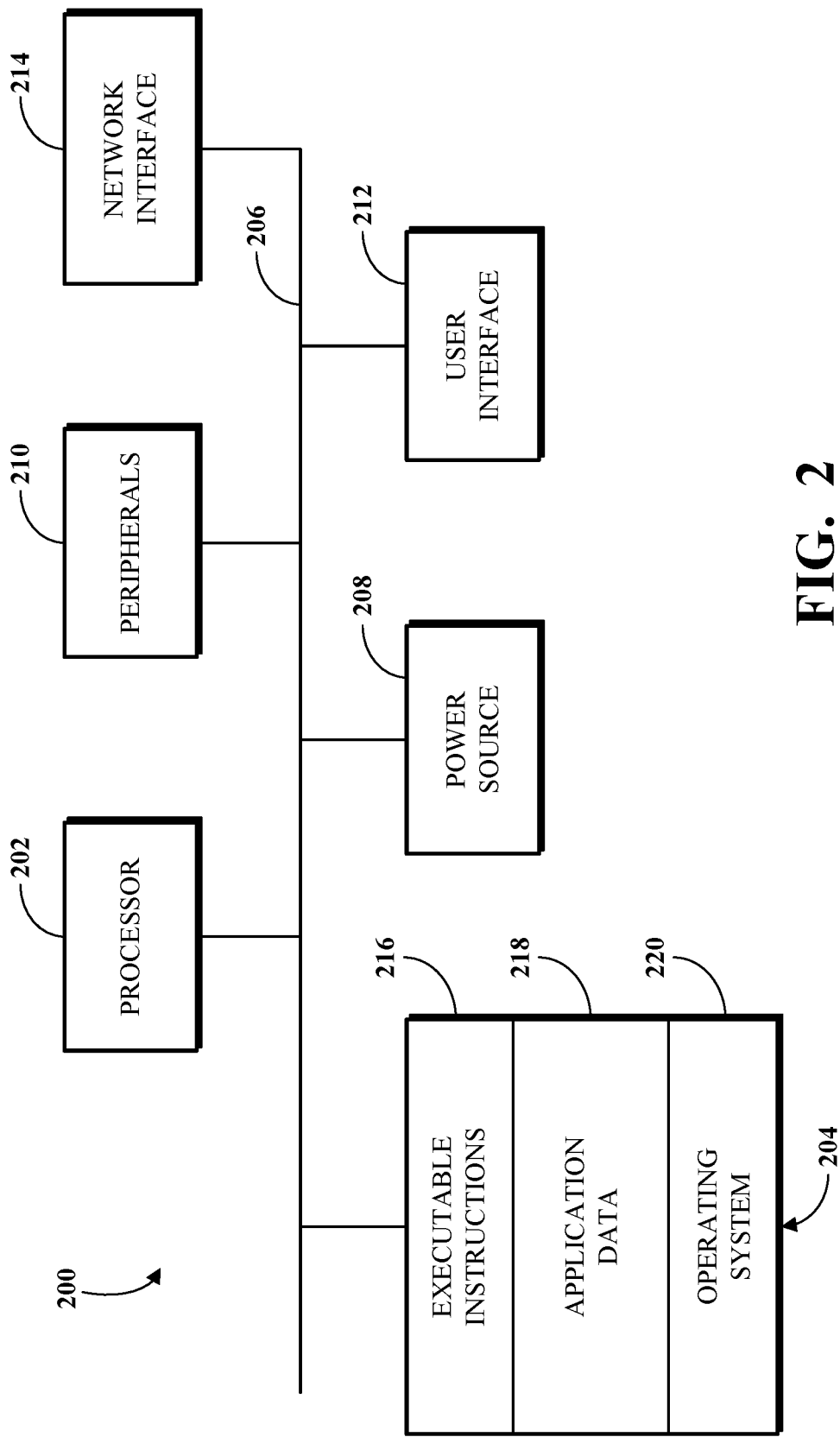
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
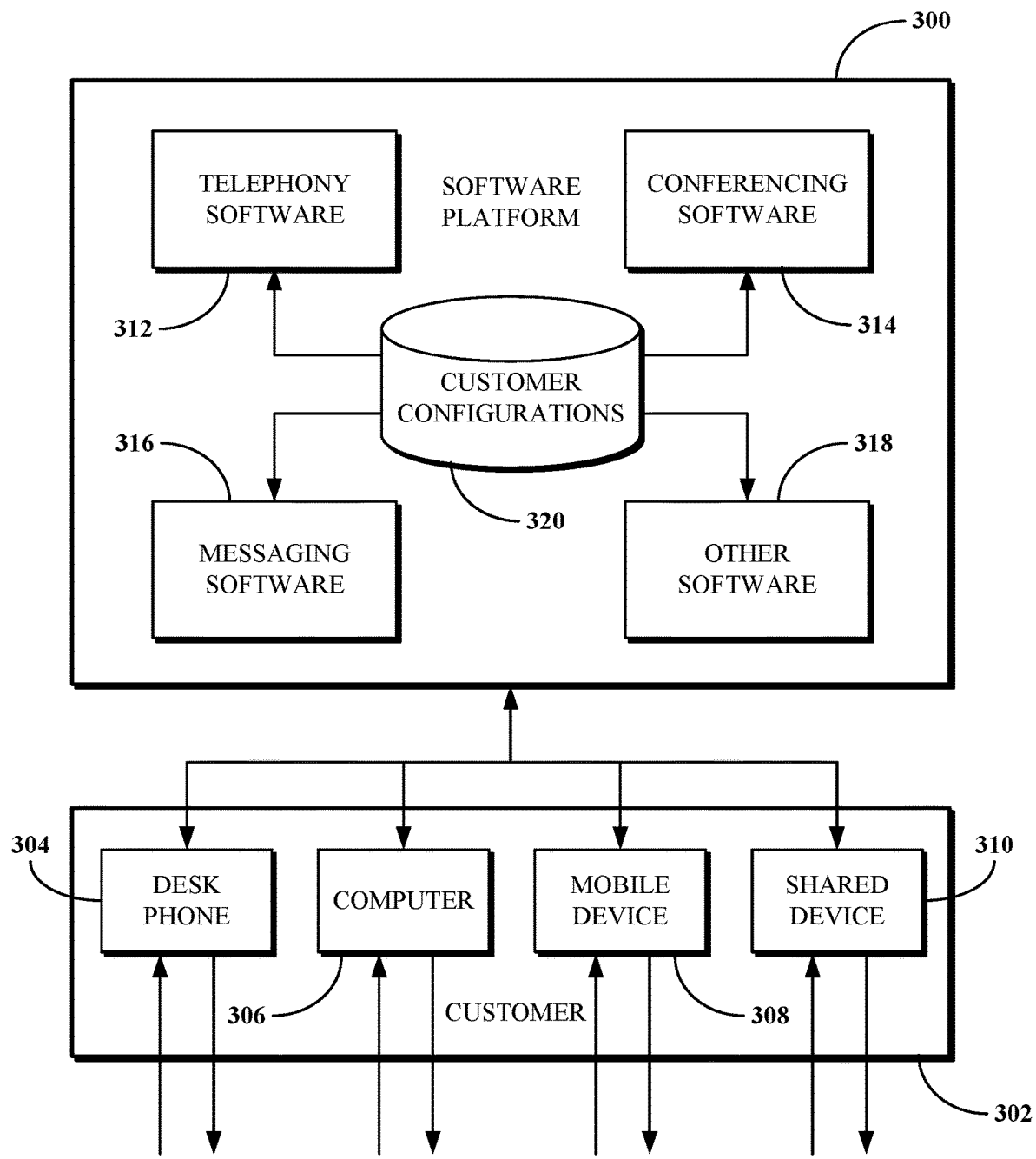
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for preprocessing conference audio data or software for processing the conference audio data in transcription or AI/ML use cases. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
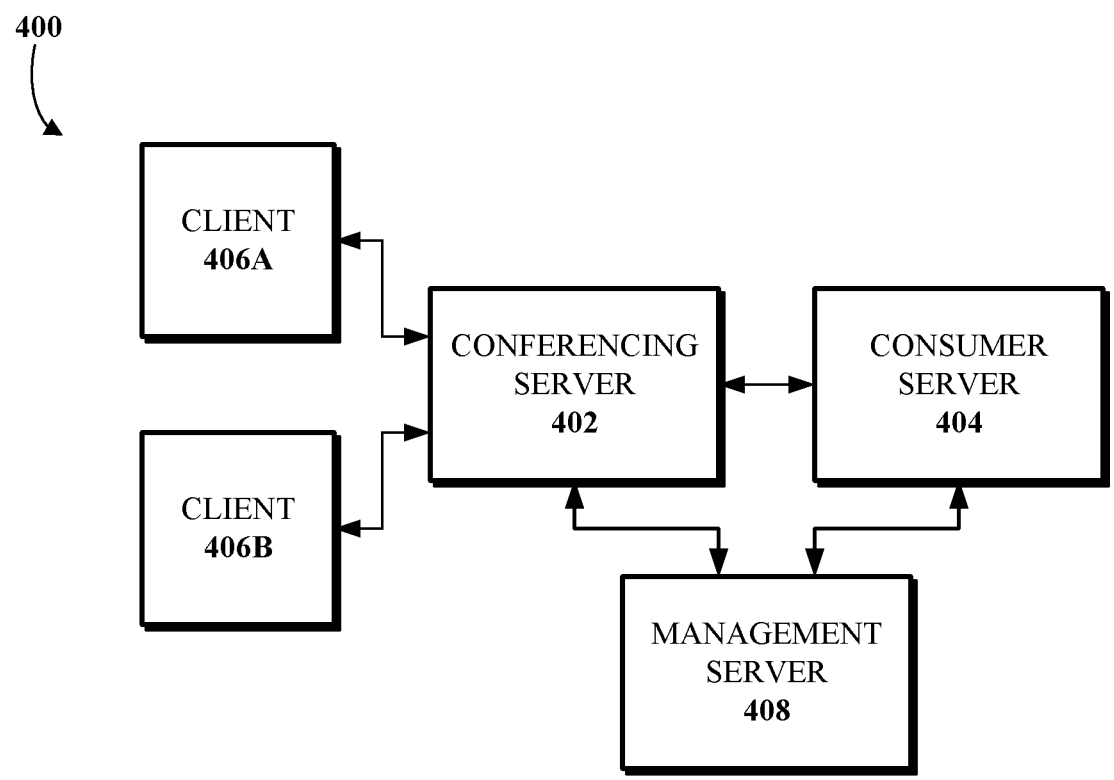
FIG. 4 is a block diagram of an example of a conferencing system.

FIG. 4 is a block diagram of an example of a conferencing system 400. As shown, the conferencing system include a conferencing server 402, a consumer server 404, clients 406A and 406B, and a management server 408. The conferencing server 402 may include the conferencing software 314 and/or may correspond to the application server 108 or the telephony server 112. The consumer server 404 may correspond to the application server 108 or the database server 110. The clients 406A and 406B may correspond to the clients 104A-D. The management server 408 may correspond to the application server 108.

According to some implementations, the clients 406A and 406B engage in a conference (e.g., a voice conference or a video conference) via the conferencing server 402. The conferencing server 402 may support transmission of at least one of audio data, camera-generated video data, or screen-sharing video data between the clients 406A and 406B.

While two clients 406A and 406B are illustrated and described by example, the disclosed technology may be implemented with other numbers of clients. As used herein, the term "video conference" may encompass at least one of a camera-generated video conference, a screensharing video conference, a virtual reality video conference, or a whiteboard video conference.

When the conference is initiated, for example, by one of the clients 406A initiating the conference with another one of the clients 406B (e.g., by placing a voice call or a video call) or by one of the clients 406A joining a pre-scheduled conference, the conferencing server 402 transmits, to the management server 408, a signal that the conference is beginning. In response, the management server 408 transmits, to the conferencing server 402, a message indicating an address of the consumer server 404 and/or authentication data of the consumer server 404, where the consumer server 404 is to receive audio data of the conference. The authentication data may be associated with an authentication protocol. The authentication protocol may be at least one of password authentication protocol (PAP), challenge-handshake authentication protocol (CHAP), extensible authentication protocol (EAP), RADIUS, TACACS+, Kerberos, OAuth 2.0, SAML 2.0, FIDO2, or WebAuthn. The conferencing server 402 connects to the consumer server 404 using the address and/or the authentication data.

During the conference, the conferencing server 402 receives audio data from the clients 406A and 406B connected to the conference. The audio data may correspond to speech in an audio conference or speech from a device (e.g., a telephone) of the clients 406A-B that does not transmit imagery. Alternatively or in addition, the audio data may correspond to the audio component of video data received from a device of the clients 406A-B. The conferencing server 402 generates multiple time-contiguous containers. Each time-contiguous container identifies a client 406A or 406B and includes one or more payloads of the audio data from that client 406A or 406B. Each payload has a predefined time length (e.g., 10 ms). The time-contiguous containers may be mutually exclusive and/or collectively exhaustive with respect to times in the conference when speech is detected by the conferencing server (i.e., each moment in time when speech is detected is associated with one and only one of the time-contiguous containers). The conferencing server 402 may terminate a current time-contiguous container and begin generating a new time-contiguous container after a threshold number of payloads (e.g., 25 payloads) are generated in the current time-contiguous container or after audio is detected from a client (e.g., the client 406A) different from the identified client (e.g., the client 406B) of the current time-contiguous container. More details of how the time-contiguous containers are generated and used are provided below. The conferencing server may use natural language processing (NLP) or natural language detection technology to detect or identify natural language speech and to detect the times when natural language speech is present.

Upon generation of each time-contiguous container, the time-contiguous container is transmitted from the conferencing server 402 to the consumer server 404. The consumer server 404 may process the received time-contiguous containers in different ways. For example, the consumer server 404 may generate a transcript of the conference based on the received time-contiguous containers. Alternatively or in addition, the received-time contiguous containers may be used by artificial intelligence software at the consumer server 404. The consumer server 404 may be a transcription server or an artificial intelligence server. More details of examples of the conferencing server 402 to the consumer server 404 are provided in conjunction with FIG. 5.

Figure 5:
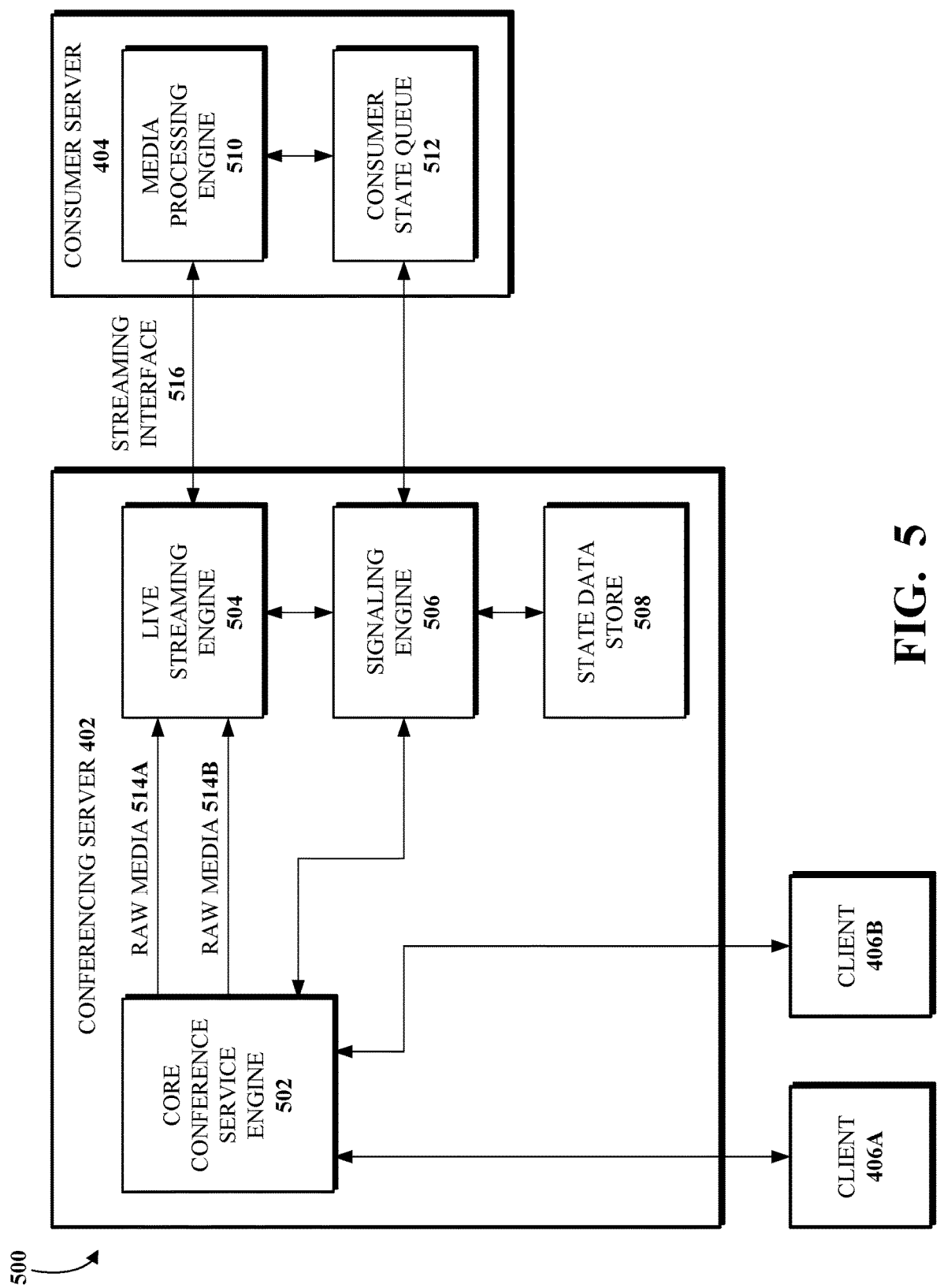
FIG. 5 is a block diagram of an example of a conferencing system for preprocessing audio data.

FIG. 5 is a block diagram of an example of a conferencing system 500 for preprocessing audio data. As shown, the conferencing system 500 includes the conferencing server 402, the consumer server 404, and the clients 406A and 406B from the conferencing system 400 of FIG. 4. As illustrated, the conferencing server 402 includes a core conference service engine 502, a live streaming engine 504, a signaling engine 506, and a state data store 508. The consumer server 404 includes a media processing engine 510 and a consumer state queue 512.

The core conference service engine 502 receives media (e.g., audio or video) from the client 406A and transmits the media to the client 406B. Similarly, the core conference service engine 502 receives media from the client 406B and transmits the media to the client 406A. As illustrated, the core conference service engine 502 transmits raw media 514A from the client 406A to the live streaming engine 504. Similarly, the core conference service engine 502 transmits raw media 514B from the client 406B to the live streaming engine 504. The media (e.g., the raw media 514A and the raw media 514B) from the clients 406A and 406B are also transmitted to the signaling engine 506. The raw media 514A and/or the raw media 514B may include audio data and/or video data, with the video data including audio and imagery. In some cases, the raw media 514A may include audio without imagery and the raw media 514B may include video with audio and imagery (or vice versa). This may occur, for example, if the client 406A is a telephone, a computer lacking a camera, or a computer with the camera disabled.

During the conference, the signaling engine 506, working in conjunction with the media processing engine 510, identifies the client 406A or 406B that is generating audio for storage. The client 406A or 406B that is generating audio for storage may be identified based on the volume level of the audio from the clients 406A-B. Alternatively, the client 406A or 406B may be identified using speech or language detection. For example, if the client 406A is generating audio including a human voice, while the client 406B is generating audio including white noise, then the client 406A is identified as the client that is generating audio for storage. In some cases, the client 406A may have a single speaker while the client 406B may have multiple speakers in the background (e.g., due to being located in a building lobby or in a coffee shop). As a result, the client 406A may be identified as the client that is generating audio for storage. The media processing engine 510 may distinguish between audio including a single speaker, audio including multiple speakers in the background, and white noise using artificial intelligence technology that is trained by supervised learning based on a labeled dataset of audio files. According to some implementations, the signaling engine 506 is not directly aware of media characteristics. Instead, this function may be handled by the media processing engine 510. It should be noted that the labeled dataset of audio files is preferably not the audio for storage or the recorded conferencing data. Some implementations do not use conference recordings, transcripts, or user data to train artificial intelligence and/or machine learning models.

Upon identification of the client 406A or 406B generating audio for storage, the signaling engine stores an identifier of that client (along with an identifier of the current time) in the state data store 508. The signaling engine 506 notifies the live streaming engine 504 of that client. The raw media 514A or 514B (e.g., including audio or video) from that client is stored in a container (e.g., as described in conjunction with FIG. 6 below) provided, via a streaming interface 516, to the media processing engine 510 of the consumer server 404.

The signaling engine 506 also notifies the consumer state queue 512 of the client 406A or 406B generating audio for storage. The consumer server 404 may leverage the consumer state queue 512 to verify that the correct containers are being received from the conferencing server 402.

Upon identifying (e.g., at the beginning of the conference or at another point of the conference) that the client 406A is generating audio for storage, the live streaming engine 504 places the raw media 514A from the client 406A into payloads of a container, where each payload includes a fixed time length (e.g., 10 ms) of audio. The container also includes an identification of the client 406A generating the audio. The client 406A may be identified by a device identifier, an account identifier (e.g., of an account being used to access the client 406A) or a user identifier (e.g., of a user logged in to the client 406A). After the passage of a certain amount of time (e.g., 250 ms), generating a certain number of payloads (e.g., 25 payloads) or determining that another client 406B is generating audio for storage, the client 406A terminates generation of the container and initiates generation of a new container.

Figure 6:
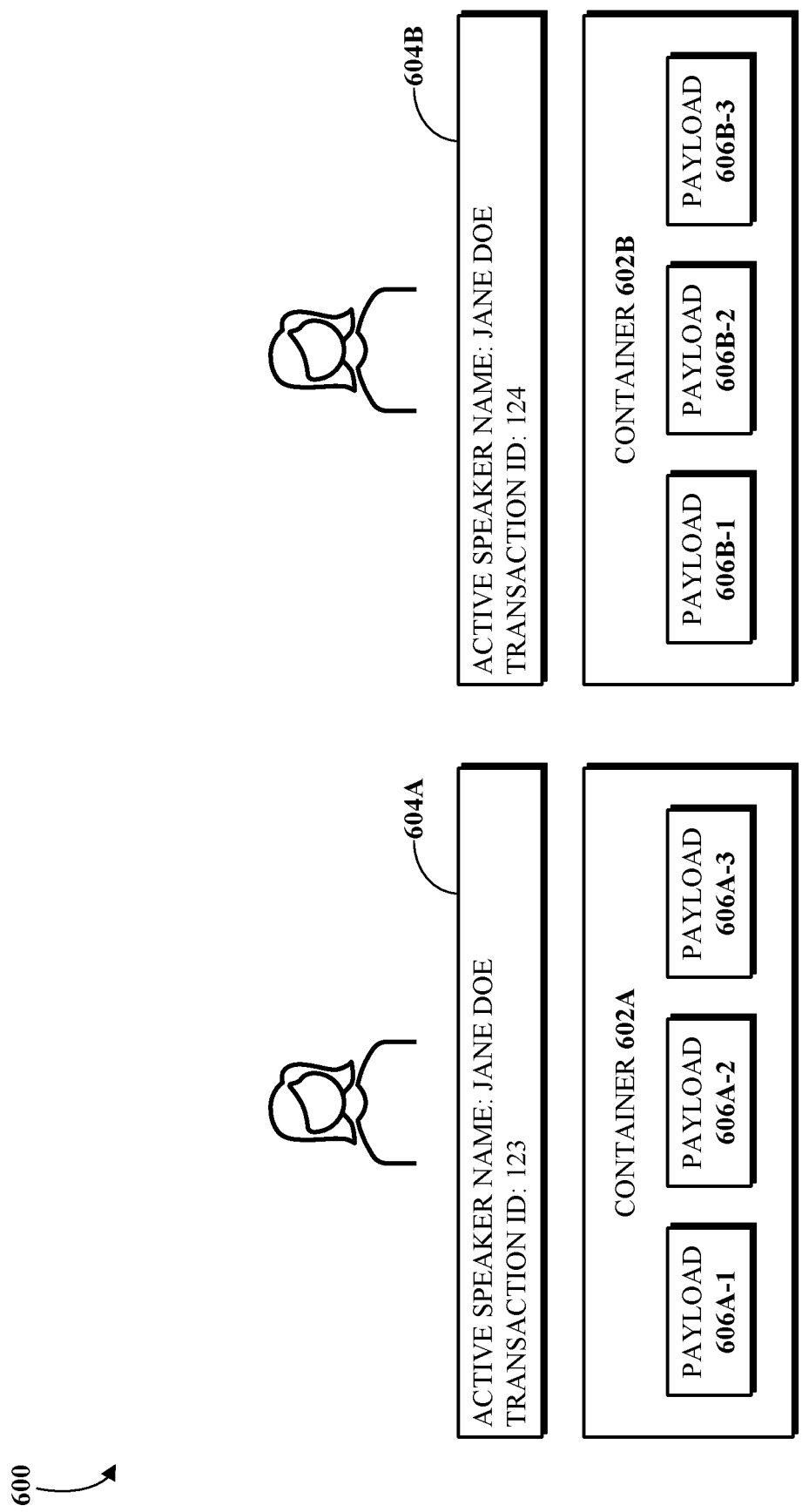
FIG. 6 is a block diagram of an example of a data plane for preprocessing conference audio data.

FIG. 6 is a block diagram of an example of a data plane 600 for preprocessing conference audio data. As shown, the data plane 600 includes two containers 602A and 602B. In alternative implementations, the data plane 600 may include other numbers of containers. As illustrated, the container 602A is coupled with a metadata tag 604A and includes multiple payloads 606A-1, 606A-2, and 606A-3. While the container 602A is illustrated as including three payloads 606A, the container 602A may include other numbers of payloads. Similarly, the container 602B is coupled with a metadata tag 604B and includes multiple payloads 606B-1, 606B-2, and 606B-3. While the metadata tag 604 (where 604 can refer to either 604A or 604B) is illustrated as being external to the container 602 (where 602 can refer to either 602A or 602B), in alternative implementations, the metadata tag 604 may be included within the container 602.

As illustrated, the metadata tag 604 includes an active speaker name and a transaction identifier (ID). The transaction ID is an identifier for the container 602, allowing the consumer server 404 and/or the conferencing server 402 to uniquely identify the container 602. The active speaker name identifies the active speaker and may correspond to at least one of an identifier (e.g., a name or a username) of a person that is speaking to produce the audio data for the container 602, an identifier of an account that is producing the audio data for the container 602, or an identifier of a device that is producing the audio data for the container 602. The person or the account may uniquely correspond to a user device (e.g., the client 406A or the client 406B) connected to the conference. In some cases, the active speaker name may be coupled with a stored image (e.g., a user profile image) associated with the active speaker.

Each container 602 includes one or more payloads 606 (where 606 can refer to at least one of 606A-1, 606A-2, 606A-3, 606B-1, 606B-2, or 606B-3). Each payload 606 includes a recording of a fixed time duration of audio data received from the users device. At a time after (e.g., immediately after or at another time when audio is generated) one payload 606 terminates, another payload 606 begins. For example, when the payload 606A-1 terminates, the payload 606A-2 begins. The payload 606A-2 may begin immediately after 606A-1. Alternatively, there may be a break between the payloads 606A-1 and 606A-2, for example, due to the person who is speaking pausing their speech and nobody else commences to speak.

At a certain time, a server (e.g., the conferencing server 402) generating the containers 602A and 602B terminates generating the container 602A and commences generating the container 602B. This could occur in response to generating a predetermined number of payloads in the container 604A, a passage of a preset time period since initiating generation of the container 604A, or detecting audio from a device different from the device identified in the metadata tag 604A (e.g., the device associated with the active speaker name in the metadata tag 604A). Each container may include audio data from the device identified in the metadata tag 604A and not from other devices.

The containers 602A, 602B, and any other containers in the data plane 600 are time-contiguous containers, and each container is associated with a time range. The time ranges of the containers 602A, 602B are mutually exclusive and/or collectively exhaustive with respect to the times when audio is detected in the conference.

In some cases, the server may detect simultaneous audio from two or more devices, for example, due to two people, at two different devices, speaking simultaneously. As a result, a container may be generated that has a metadata tag identifying the two or more devices providing the simultaneous audio and includes the audio from both devices. Alternatively, one device of the two or more devices may be selected for generating audio for the container. The one device may be selected based on at least one of: the device generating audio for a currently-generated container (e.g., the person that was speaking before others interrupted them), the device generating audio for a previously-generated container, a volume of the audio data from at least one of the two or more of the devices (e.g., the person who is speaking the loudest), or stored information about a user of the at least one of the two or more of the devices (e.g., the host of the conference, the person with the highest title (e.g., the chief executive officer), or the person from a same business as the host).

In an example use case of the disclosed technology, a user named Anna engages in a conference with a user named Bob. To initiate the conference, Anna provides a link to Bob, and Anna's user device and Bob's user device connect to the conference via the link, which is associated with the conferencing server 402. Based on settings provided by Anna's employer, the consumer server 404, which is to transcribe the conference in real-time during the conference, is identified.

At the beginning of the conference, Anna says, "Hello Bob," while Bob sits on a roadside bench with street noise behind himself. The conferencing server 402 uses audio processing techniques (e.g., artificial intelligence techniques) to determine that the audio from Anna's user device includes speech, while the audio from Bob's user device includes background noise. Thus, the audio from Anna's user device is selected for generating the containers. The containers are transmitted from the conferencing server 402 to the consumer server 404, and the consumer server 404 generates the line, "Anna: Hello Bob," in the transcript.

After Anna finishes speaking, Bob says, "Hello Anna." The conferencing server determines that Anna's user device is no longer generating audio data (or that the audio data from Anna's user device lacks volume or lacks speech) and Bob's user device is generating audio data. In response, the audio from Bob's user device is used to generate the containers, as described herein. The containers are transmitted from the conferencing server 402 to the consumer server 404, and the consumer server 404 generates the line, "Bob: Hello Anna," in the transcript.

After Bob says, "Hello Anna," Bob and Anna start speaking simultaneously, with Bob saying, "Let's discuss the quarterly report," and Anna saying, "Did you get my email?" Anna speaks at a higher volume than Bob. Based on settings provided by the information technology (IT) administrator of Anna's employer, when two or more users are speaking simultaneously, the user device which is generating audio at the highest volume has its audio provided to the consumer server 404. Thus, the audio from Anna's device is placed into containers and transmitted to the consumer server 404. The consumer server generates the line "Anna: Did you get my email," in the transcript. The line, "Bob: Let's discuss the quarterly report," is not placed into the transcript. In alternative implementations, the line from Bob could have been placed into the transcript (e.g., due to Bob having spoken (by saying, "Hello Anna") immediately before this line was spoken) or a blend of the audio from Anna's user device and Bob's user device could have been placed into the transcript generated by the consumer server 404.

Figure 7:
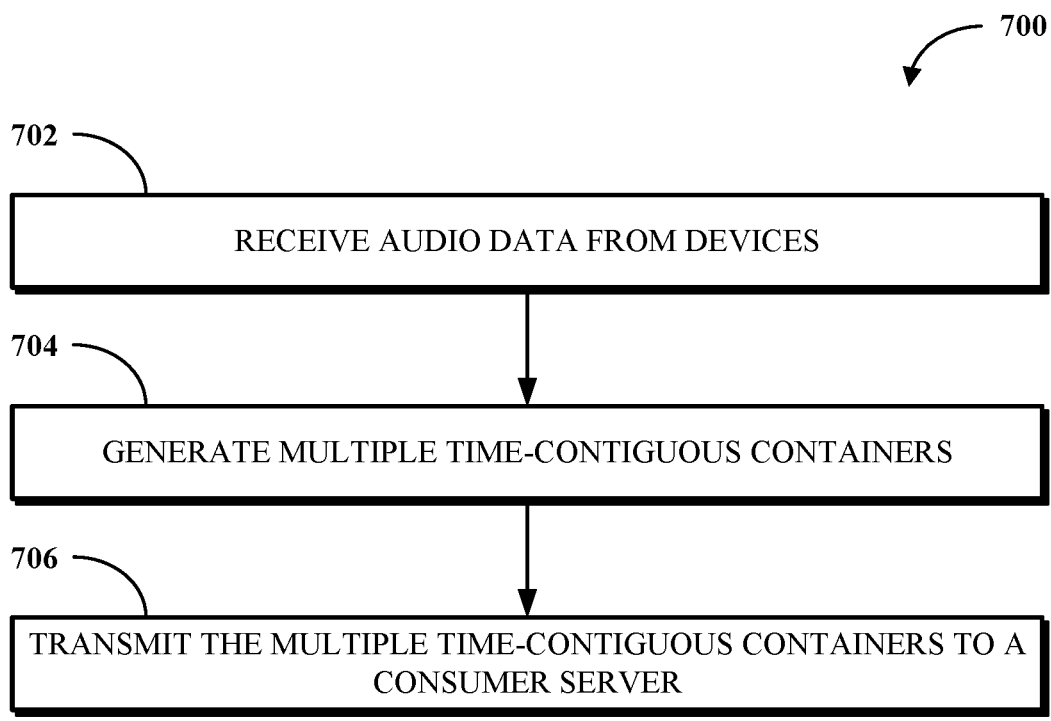
FIG. 7 is a flowchart of an example of a technique for preprocessing conference audio data at a conferencing server.
Figure 8:
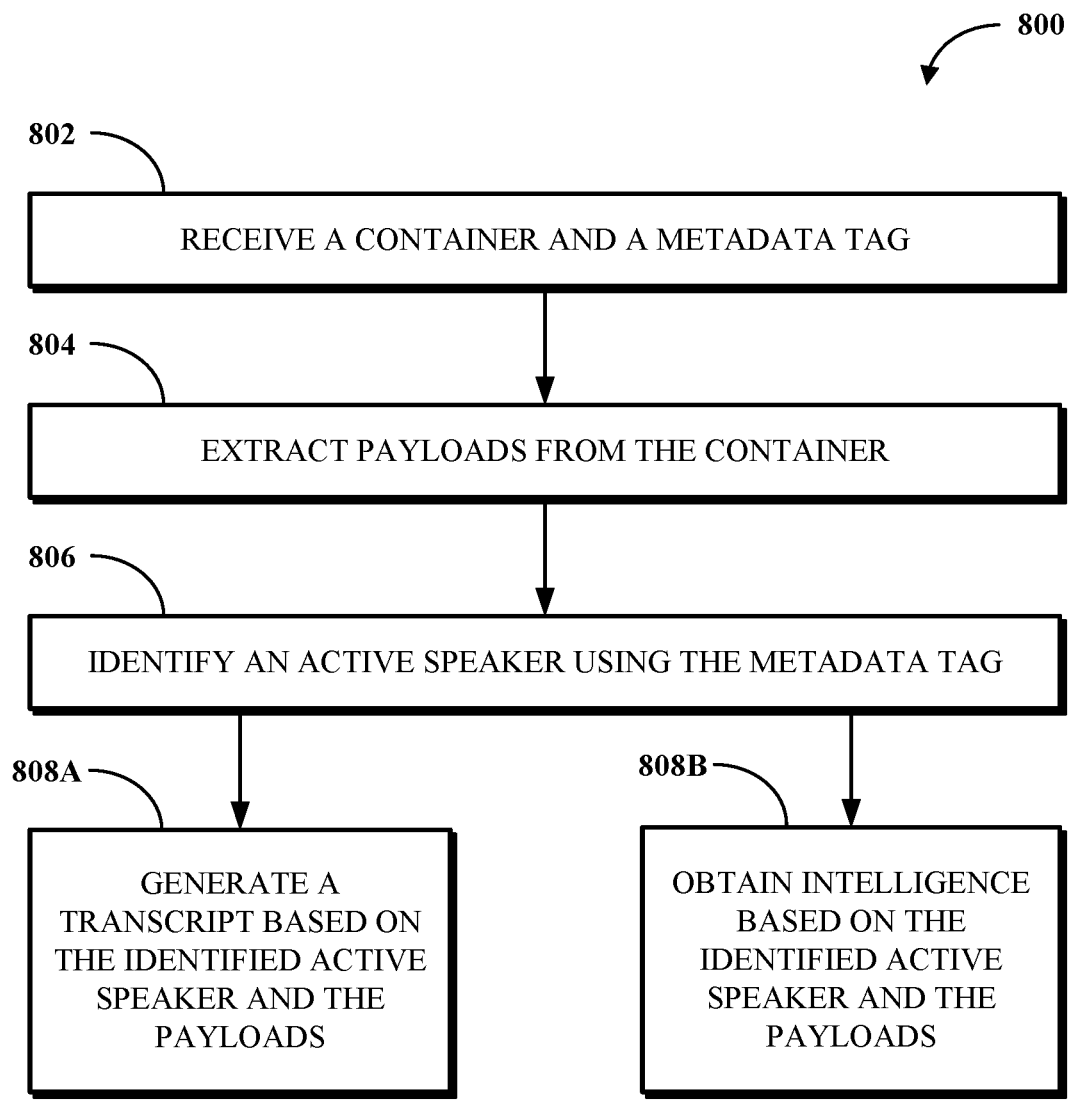
FIG. 8 is a flowchart of an example of a technique for processing conference audio data at a consumer server.
Figure 9:
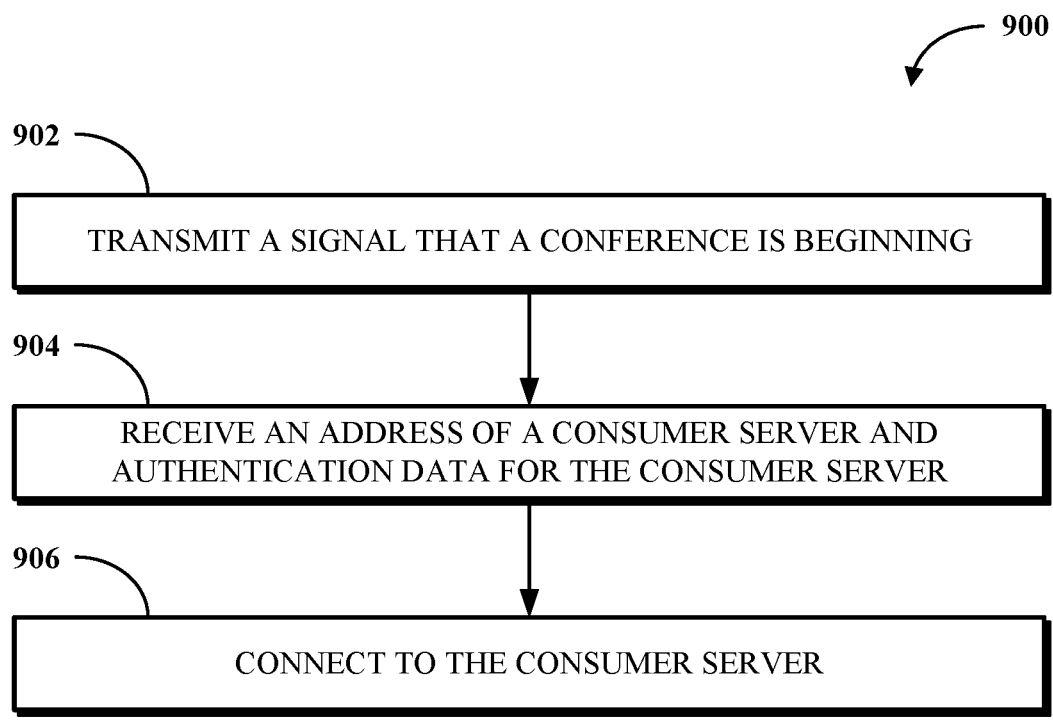
FIG. 9 is a flowchart of an example of a technique for connecting to a consumer server.

To further describe some implementations in greater detail, reference is next made to examples of techniques which may be performed by a system for preprocessing conference audio data. FIG. 7 is a flowchart of an example of a technique 700 for preprocessing conference audio data at a conferencing server. FIG. 8 is a flowchart of an example of a technique 800 for processing conference audio data at a consumer server. FIG. 9 is a flowchart of an example of a technique 900 for connecting to a consumer server. The techniques 700, 800, and/or 900 can be executed using computing devices, such as the systems, hardware, and software described with respect to FIGS. 1-6. The techniques 700, 800, and/or 900 can be performed, for example, by executing a machine-readable program or other computer-executable instructions, such as routines, instructions, programs, or other code. The steps, or operations, of the techniques 700, 800, and/or 900 or another technique, method, process, or algorithm described in connection with the implementations disclosed herein can be implemented directly in hardware, firmware, software executed by hardware, circuitry, or a combination thereof.

For simplicity of explanation, the techniques 700, 800, and/or 900 are depicted and described herein as series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 illustrates the technique 700 for preprocessing conference audio data. The technique 700 may be performed at a conferencing server (e.g., the conferencing server 402).

At 702, the conferencing server receives audio data from devices (e.g., the clients 406A and 406B) connected to a conference. The audio data may be received alone or in conjunction with imagery (e.g., as video data) or other media. The audio data may be received over a network connection and/or over a direct wired and/or wireless connection.

At 704, the conferencing server generates multiple time-contiguous containers (e.g., the containers 602A and 602B). Each time-contiguous container includes a metadata tag (e.g., the metadata tag 604A) that identifies an associated device of the devices and one or more payloads (e.g., the payloads 606A-1, 606A-2, 606A-3, 606B-1, 606B-2, and 606B-3) of the audio data from the associated device. Each payload has a predefined time length. The conferencing server transitions between time-contiguous containers (e.g., stops generating a first time-contiguous container and starts generating a second time-contiguous container) in response to at least one of generating a predetermined number of payloads in the first time-contiguous container, a passage of a preset time period since initiating generation of the first time-contiguous container, or detecting audio from a device of the devices, the device being different from the associated device.

The payloads are described above as including audio data. In some cases, the payloads may include video data with audio and imagery. In some cases, the audio or video data in the payloads may be coupled with other media (e.g., file sharing data from the conference or text messages transmitted in the conference via a chat functionality)

At 706, the conferencing server transmits the multiple time-contiguous containers to a consumer server (e.g., the consumer server 404) for processing. The consumer server may perform transcription, AI/ML inference, or other functions. Each of the multiple time-contiguous containers may be transmitted from the conferencing server to the consumer server in real-time after the time-contiguous container is generated. As a result, the consumer server may process the multiple time-contiguous containers during the conference. For example, the consumer server could generate a transcript of the conference during the conference, so that a user who joins the conference late could read the transcript and learn what was already discussed. The consumer server could generate (e.g., using NLP technology, such as a large language model (LLM) or a generative pre-trained transformer (GPT)) a written summary of what was already discussed in the conference so that the late-joining user could more quickly learn what was already discussed. Examples of operation of the consumer server are described in conjunction with FIG. 8.

FIG. 8 illustrates the technique 800 for processing conference audio data. The technique 800 may be performed at a consumer server (e.g., the consumer server 404).

At 802, the consumer server receives a container (e.g., the container 602A) and a metadata tag (e.g., the metadata tag 604A) from the conferencing server (e.g., the conferencing server 402). The container and the metadata tag may be generated at the conferencing server and transmitted to the consumer server as described in conjunction with FIG. 7. The transmission may occur in real-time after the generation of the container.

At 804, the consumer server extracts one or more payloads (e.g., the payloads 606A-1, 606A-2, and 606A-3) from the container. The container includes the one or more payloads of audio data. In some cases, at least one of the payloads may include other media in addition to the audio data.

At 806, the consumer server identifies an active speaker using the metadata tag. The active speaker may correspond to a user device (e.g., the client 406A or the client 406B) that generated the audio in the payloads. After 806, the technique 800 continues to at least one of 808A or 808B.

At 808A, the consumer server generates a transcript based on the identified active speaker and the payloads. The transcript may be generated in real-time during the conference. The transcript may be displayed within a graphical user interface of the conferencing software (or otherwise accessible to users participating in the conference via the devices connected to the conference) to assist users (e.g., users who are hard of hearing or users who are not fluent in a language spoken during the conference) in understanding what was said.

At 808B, the consumer server obtains intelligence based on the identified active speaker and the payloads. The intelligence may be obtained using an AI inference technique. For example, in a conference discussing a contemplated business-to-business sales transaction, the intelligence may predict (e.g., using GPT technology that reviews the media in the payloads including the audio data and, in some cases, imagery (e.g., including facial expressions) and the content of any files that are shared or text-based chat messaged) a likelihood that the transaction will close based on what was stated in the conference. When a buyer makes an objection or asks a question, the intelligence may include proposed responses to the objection or proposed answers to the question, allowing the sales person to provide a high quality response in real-time, without having to do research or ask for assistance of other team members.

FIG. 9 illustrates the technique 900 for connecting to a consumer server (e.g., the consumer server 404). The technique 900 may be performed by a conferencing server (e.g., the conferencing server 402). The technique 900 may be performed before the technique 700 of FIG. 7.

At 902, the conferencing server transmits, to a management server (e.g., the management server 408), a signal that a conference is beginning. The conferencing server determines that the conference is beginning in response to a user device (e.g., one of the client 406A or 406B) connecting to a prescheduled conference via the conferencing server, a user device accessing a virtual conference room via the conferencing sever, or a user device initiating a conference (e.g., at least one of a telephone call, an audio call or a video call) with at least one other user device via the conferencing server. The conferencing server transmits the signal in response to determining that the conference is beginning.

At 904, the conferencing server receives an address of a consumer server and authentication data for the consumer server from the management server in response to the signal. The management server may identify the consumer server based on settings of a user account initiating the conference or based on settings of a user account hosting the conference. The settings may be set by an IT administrator associated with the user account. For example, an IT administrator of an accounting firm might select a transcription server as the consumer server. An IT administrator of a real estate agency might select a server running artificial intelligence technology that predicts the likelihood of a real estate transaction closing as the consumer server.

The authentication data may be associated with an authentication protocol for the consumer server. For example, if the consumer server uses PAP, the authentication data may include an identifier and a password. If the consumer server uses Kerberos, the authentication data may include at least one of a principal name (e.g., including an Internet Protocol (IP) address and a domain name), a key, or a service principal name (SPN).

At 906, the conferencing server connects to the consumer server at the address using the authentication data. The conferencing server then transmits containers generated during the conference to the consumer server per the technique 700 of FIG. 7.

Some implementations are described below as numbered examples (Example 1, 2, 3, etc.). These examples are provided as examples only and do not limit the other implementations disclosed herein.

Example 1 is a method, comprising: receiving, at a conferencing server, audio data from devices connected to a conference; generating, at the conferencing server, multiple time-contiguous containers, each time-contiguous container including an identifier of an associated device of the devices and one or more payloads of the audio data from the associated device, each payload having a predefined time length; and transmitting the multiple time-contiguous containers to a consumer server.

In Example 2, the subject matter of Example 1 includes, wherein generating the multiple time-contiguous containers comprises terminating generation of a first time-contiguous container of the multiple time-contiguous containers and initiating generation of a second time-contiguous container of the multiple time-contiguous containers in response to at least one of: generating a predetermined number of payloads in the first time-contiguous container, a passage of a preset time period since initiating generation of the first time-contiguous container, or detecting audio from a device of the devices that is different from the associated device.

In Example 3, the subject matter of Examples 1-2 includes, wherein each time-contiguous container of the multiple time-contiguous containers is associated with a time range, wherein time ranges of the multiple time-contiguous containers are mutually exclusive.

In Example 4, the subject matter of Examples 1-3 includes, wherein each time-contiguous container comprises the audio data from the associated device and lacks audio from devices different from the associated device.

In Example 5, the subject matter of Examples 1-4 includes, detecting simultaneous audio from two or more of the devices; and generating a time-contiguous container of the multiple time-contiguous containers, wherein the time-contiguous container comprises identifiers of the two or more of the devices and the one or more payloads of the audio data from the two or more of the devices.

In Example 6, the subject matter of Examples 1-5 includes, detecting simultaneous audio from two or more of the devices; and selecting one of the two or more of the devices for generating a container based on at least one of: the associated device of a currently-generated time-contiguous container of the multiple time-contiguous containers, the associated device of a previously-generated time-contiguous container of the multiple time-contiguous containers, a volume of the audio data from at least one of the two or more of the devices, or stored information about a user of the at least one of the two or more of the devices.

In Example 7, the subject matter of Examples 1-6 includes, wherein the consumer server comprises at least one of: a transcription server or an artificial intelligence inference server, and wherein the multiple time-contiguous containers are provided to the consumer server for processing at the consumer server.

In Example 8, the subject matter of Examples 1-7 includes, transmitting, to a management server, a signal that the conference is beginning; receiving, from the management server, an address of the consumer server and authentication data for the consumer server; connecting to the consumer server, to provide the multiple time-contiguous containers, using the received address and the authentication data.

In Example 9, the subject matter of Examples 1-8 includes, wherein a time-contiguous container of the multiple time-contiguous containers is provided to the consumer server in real-time after generating the time-contiguous container.

In Example 10, the subject matter of Examples 1-9 includes, wherein the conference is a video conference or an audio conference.

Example 11 is a non-transitory computer readable medium storing instructions operable to cause one or more processors to perform operations comprising: receiving, at a conferencing server, audio data from devices connected to a conference; generating, at the conferencing server, multiple time-contiguous containers, each time-contiguous container including an identifier of an associated device of the devices and one or more payloads of the audio data from the associated device, each payload having a predefined time length; and transmitting the multiple time-contiguous containers to a consumer server.

In Example 12, the subject matter of Example 11 includes, wherein generating the multiple time-contiguous containers comprises terminating generation of a first time-contiguous container of the multiple time-contiguous containers and initiating generation of a second time-contiguous container of the multiple time-contiguous containers in response to at least one of: generating a predetermined number of payloads in the first time-contiguous container or detecting audio from a device of the devices that is different from the associated device.

In Example 13, the subject matter of Examples 11-12 includes, wherein each time-contiguous container of the multiple time-contiguous containers is associated with a time range, wherein time ranges of the multiple time-contiguous containers are mutually exclusive and collectively exhaustive with respect to times in the conference when speech is detected.

In Example 14, the subject matter of Examples 11-13 includes, wherein each time-contiguous container comprises the audio data from the associated device.

In Example 15, the subject matter of Examples 11-14 includes, the operations comprising: detecting simultaneous audio from at least two of the devices; and generating a time-contiguous container of the multiple time-contiguous containers, wherein the time-contiguous container comprises identifiers of the at least two of the devices and the one or more payloads of the audio data from the at least two of the devices.

In Example 16, the subject matter of Examples 11-15 includes, the operations comprising: detecting simultaneous audio from at least two of the devices; and selecting one of the at least two of the devices for generating a container based on at least one of: the associated device of a currently-generated time-contiguous container of the multiple time-contiguous containers, the associated device of a previously-generated time-contiguous container of the multiple time-contiguous containers, a volume of the audio data from one or more of the at least two of the devices.

In Example 17, the subject matter of Examples 11-16 includes, the operations comprising: transmitting, to a management server, a signal that the conference is commencing; receiving, from the management server, authentication data for the consumer server; connecting to the consumer server, to provide the multiple time-contiguous containers, using the received authentication data.

Example 18 is a system, comprising: a memory subsystem; and processing circuitry configured to execute instructions stored in the memory subsystem to: receive, at a conferencing server, audio data from devices connected to a conference; generate, at the conferencing server, multiple time-contiguous containers, each time-contiguous container including an identifier of an associated device of the devices and one or more payloads of the audio data from the associated device, each payload having a predefined time length; and transmit the multiple time-contiguous containers to a consumer server.

In Example 19, the subject matter of Example 18 includes, wherein generating the multiple time-contiguous containers comprises terminating generation of a first time-contiguous container of the multiple time-contiguous containers and initiating generation of a second time-contiguous container of the multiple time-contiguous containers in response to at least one of: a passage of a preset time period since initiating generation of the first time-contiguous container or detecting audio from a device of the devices that is different from the associated device.

In Example 20, the subject matter of Examples 18-19 includes, wherein each time-contiguous container of the multiple time-contiguous containers is associated with a time range, wherein time ranges of the multiple time-contiguous containers are collectively exhaustive with respect to times in the conference when speech is detected.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

As used herein, the term "real-time" may include an event occurring without any intentional delay. Some delay may still occur, for example, due to latency in the processing circuitry, the network interface, the network, or other components. In the phrase, "a computer transmits a signal in real-time after the computer calculates a value," the signal may be transmitted 10 milliseconds, one second, one minute, one hour, or several hours after the value is calculated, as long as the delay is due to latency in the processing circuitry, the network interface, the network, or another component, and there is no intentional delay programmed into the software or hard-wired into the hardware of the computer.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, at a conferencing server, first audio data from a first device connected to a conference and second audio data from a second device connected to the conference;
selecting, at the conferencing server, a portion of the first audio data corresponding to a first time frame for additional processing at a consumer server;
selecting, at the conference server, a portion of the second audio data corresponding to a second time frame for additional processing at the consumer server;
generating, at the conferencing server, a first time-contiguous container for only the portion of the first audio data corresponding to the first time frame, wherein the first time-contiguous container includes an identifier of the first device;
generating, at the conference server, a second time-contiguous container for only the portion of the second audio data corresponding to the second time frame, wherein the second time-contiguous container includes an identifier of the second device;
transmitting, at the conference server, the first audio data and the second audio data to each device connected to the conference; and
transmitting, at the conference server, the first and second time-contiguous containers to the consumer server.

2. The method of claim 1, wherein generation of the second time-contiguous container is in response to at least one of: generating a predetermined number of payloads in the first time-contiguous container, a passage of a preset time period since initiating generation of the first time-contiguous container, or detecting audio from the second device.

3. The method of claim 1, wherein the first time frame is contiguous to the second time frame ranges.

4. The method of claim 1, wherein the first time-contiguous container does not include audio from devices other than the first device.

5. The method of claim 1, comprising:
detecting simultaneous audio from the first device and the second device at a third time frame;
selecting a portion of the first audio data corresponding to the third time frame and a portion of the second audio data corresponding to the third time frame; and generating a third time-contiguous container that includes identifiers of the first device and the second device and both the portion of the first audio data corresponding to the third time frame and the portion of the second audio data corresponding to the third time frame.

6. The method of claim 1, comprising:
detecting simultaneous audio from the first device and the second device at a third time frame; and
selecting between a portion of the first audio data corresponding to the third time frame and a portion of the second audio data corresponding to the third time frame based on at least one of: which device is associated with a currently-generated time-contiguous container corresponding to a time frame immediately preceding the third time frame, which device is associated with a previously-generated time-contiguous container, a comparison between a volume of the portion of the first audio data corresponding to the third time frame and a volume of the portion of the second audio data corresponding to the third time frame, or stored information about a user of the first device and a user of the second device.

7. The method of claim 1, wherein the consumer server comprises at least one of: a transcription server or an artificial intelligence inference server.

8. The method of claim 1, comprising:
transmitting, to a management server, a signal that the conference is beginning;
receiving, from the management server, an address of the consumer server and authentication data for the consumer server;
connecting to the consumer server, to transmit the first and second time-contiguous containers, using the received address and the authentication data.

9. The method of claim 1, wherein the first time-contiguous container is transmitted to the consumer server in real-time after generating the first time-contiguous container.

10. The method of claim 1, wherein the conference is a video conference or an audio conference.

11. A non-transitory computer readable medium storing instructions operable to cause one or more processors to perform operations comprising:
receiving, at a conferencing server, first audio data from a first devices connected to a conference and second audio data from a second device connected to the conference;
selecting, at the conferencing server, a portion of the first audio data corresponding to a first time frame for additional processing at a consumer server;
selecting, at the conference server, a portion of the second audio data corresponding to a second time frame for additional processing at the consumer server;
generating, at the conferencing server, a first time-contiguous containers for only the portion of the first audio data corresponding to the first time frame, wherein the first time-contiguous container includes an identifier of the first device;
generating, at the conference server, a second time-contiguous container for only the portion of the second audio data corresponding to the second time frame, wherein the second time-contiguous container includes an identifier of the second device;
transmitting, at the conference server, the first audio data and the second audio data to each device connected to the conference; and
transmitting, at the conference server, the first and second time-contiguous containers to the consumer server.

12. The non-transitory computer readable medium of claim 11, wherein generation of the second time-contiguous container is in response to at least one of: generating a predetermined number of payloads in the first time-contiguous container or detecting audio from the second device.

13. The non-transitory computer readable medium of claim 11, wherein the first time frame is contiguous to the second time frame, and wherein the first time frame and the second time frame correspond to times in the conference when speech is detected.

14. The non-transitory computer readable medium of claim 11, wherein the first time-contiguous container does not include audio from devices other than the first device.

15. The non-transitory computer readable medium of claim 11, the operations comprising:
detecting simultaneous audio from the first device and the second device at a third time frame;
selecting a portion of the first audio data corresponding to the third time frame and a portion of the second audio data corresponding to the third time frame; and
generating a third time-contiguous container that includes identifiers of the first device and the second device and both the portion of the first audio data corresponding to the third time frame and the portion of the second audio data corresponding to the third time frame.

16. The non-transitory computer readable medium of claim 11, the operations comprising:
detecting simultaneous audio from the first device and the second device at a third time frame; and
selecting between a portion of the first audio data corresponding to the third time frame and a portion of the second audio data corresponding to the third time frame based on at least one of: which device is associated with a currently-generated time-contiguous container corresponding to a time frame immediately preceding the third time frame, which device is associated with a previously-generated time-contiguous container, or a comparison between a volume of the portion of the first audio data corresponding to the third time frame and a volume of the portion of the second audio data corresponding to the third time frame.

17. The non-transitory computer readable medium of claim 11, the operations comprising:
transmitting, to a management server, a signal that the conference is commencing;
receiving, from the management server, authentication data for the consumer server;
connecting to the consumer server, to transmit the first and second time-contiguous containers, using the received authentication data.

18. A system, comprising:
a memory subsystem; and
processing circuitry configured to execute instructions stored in the memory subsystem to:
receive, at a conferencing server, first audio data from a first device connected to a conference and second audio data from a second device connected to the conference;
select, at the conferencing server, a portion of the first audio data corresponding to a first time frame for additional processing at a consumer server;
select, at the conference server, a portion of the second audio data corresponding to a second time frame for additional processing at the consumer server;

generate, at the conferencing server, a first time-contiguous containers for only the portion of the first audio data corresponding to the first time frame, wherein the first time-contiguous container includes an identifier of the first device;

generate, at the conferencing server, a second time-contiguous container for only the portion of the second audio data corresponding to the second time frame, wherein the second time-contiguous container includes an identifier of the second device;

transmit, at the conference server, the first audio data and the second audio data to each device connected to the conference; and transmit, at the conference server, the first and second time-contiguous containers to the consumer server.

19. The system of claim 18, wherein generation of the second time-contiguous container is in response to at least one of: a passage of a preset time period since initiating generation of the first time-contiguous container or detecting audio from the second device.

20. The system of claim 18, wherein the first time frame is contiguous to the second time frame.

* * * * *

UNITED STATES PATENT AND TRADEMARK OFFICE
CERTIFICATE OF CORRECTION

PATENT NO. : 12,200,031 B1
APPLICATION NO. : 18/474769
DATED : January 14, 2025
INVENTOR(S) : Sumitha Pillutla et al.

Page 1 of 1

It is certified that error appears in the above-identified patent and that said Letters Patent is hereby corrected as shown below:

In the Specification

In Column 14, Lines 5–16:
At a certain time, a server (e.g., the conferencing server 402) generating the containers 602A and 602B terminates generating the container 602A and commences generating the container 602B. This could occur in response to generating a predetermined number of payloads in the container 604A, a passage of a preset time period since initiating generation of the container 604A, or detecting audio from a device different from the device identified in the metadata tag 604A (e.g., the device associated with the active speaker name in the metadata tag 604A). Each container may include audio data from the device identified in the metadata tag 604A and not from other devices.
Should be:
At a certain time, a server (e.g., the conferencing server 402) generating the containers 602A and 602B terminates generating the container 602A and commences generating the container 602B. This could occur in response to generating a predetermined number of payloads 606A in the container 602A, a passage of a preset time period since initiating generation of the container 602A, or detecting audio from a device different from the device identified in the metadata tag 604A (e.g., the device associated with the active speaker name in the metadata tag 604A). Each container may include audio data from the device identified in the metadata tag 604A and not from other devices.

Signed and Sealed this
Eighteenth Day of March, 2025

Coke Morgan Stewart
*Acting Director of the United States Patent and Trademark Office*